(12) United States Patent
May

(10) Patent No.: US 6,614,419 B1
(45) Date of Patent: Sep. 2, 2003

(54) USER INTERFACE FOR USE IN A MULTIFUNCTIONAL DISPLAY (MFD)

(75) Inventor: Vincent P. May, Margate (GB)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/566,688

(22) Filed: May 8, 2000

Related U.S. Application Data

(60) Provisional application No. 60/152,899, filed on Sep. 8, 1999.

(51) Int. Cl.[7] .................................................. G09G 5/00
(52) U.S. Cl. ....................................... 345/156; 345/173

(58) Field of Search .................................. 345/173, 172, 345/169, 170, 810, 812, 818, 773, 156; 341/21, 22, 23; 701/28, 36, 200; 702/68; 40/427, 443, 444

(56) References Cited

U.S. PATENT DOCUMENTS

| 5,614,993 A | * | 3/1997 | Smith et al. ................. 345/173 |
| 6,158,156 A | * | 12/2000 | Patrick ......................... 40/443 |
| 6,260,859 B1 | * | 7/2001 | Dixon et al. ............. 280/5.514 |

* cited by examiner

Primary Examiner—Chanh Nguyen

(57) ABSTRACT

A method and apparatus for labeling one or more control keys, knobs or switches positioned adjacent to a display screen using a combination of both "Secret Until Lit" labeling and soft on-screen labeling with each single control.

30 Claims, 11 Drawing Sheets

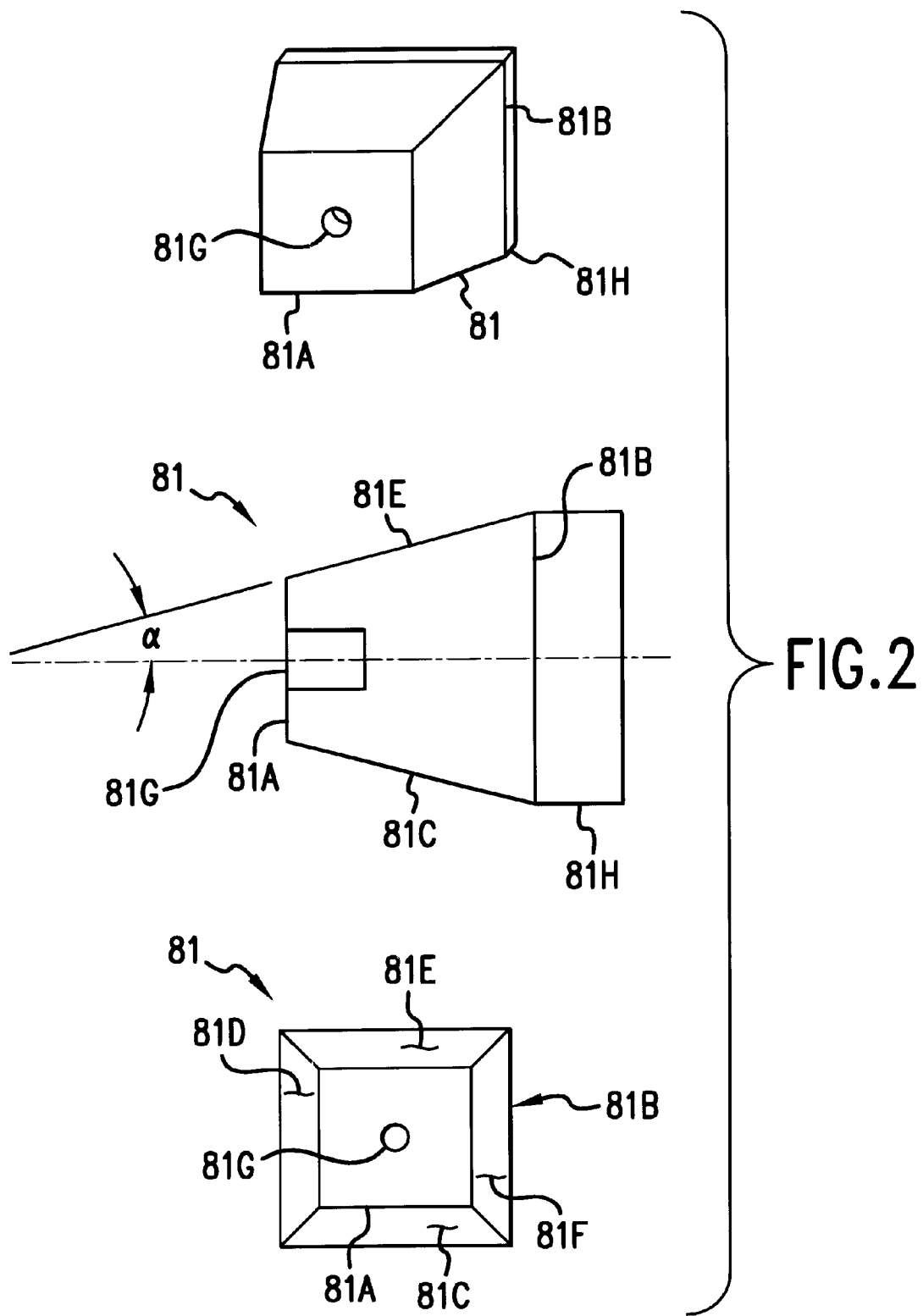

USER INTERFACE FOR USE IN A MULTIFUNCTIONAL DISPLAY (MFD)

This application claims the benefit of U.S. Provisional Application Serial No. 60/152,899, entitled, SECRET UNTIL LIT (SUL) KEY LABELING IN COMBINATION WITH SOFT KEY LABELING, filed in the name of Vincent Phillip May on Sep. 8, 1999, the complete disclosure of which is incorporated herein by reference.

FIELD OF THE INVENTION

The present invention relates to multifunctional displays and, in particular, to labeling functional control keys of multifunctional displays.

BACKGROUND OF THE INVENTION

Generally, the controls on interactive displays are either hard labeled or soft labeled. Hard labels, sometimes referred to as "fixed," are those legends unchangeably printed on or near the control key, switch, or knob. Soft labels are legends printed on a display screen, typically adjacent to the control key, switch, or knob. Each are well known means of labeling.

Hard labeling limits the introduction of upgrades and additional features or functions into a device. The inability to change hard labels in an existing device limits the scope of changes that can be made to functions and features of that device. One printer device described in U.S. Pat. No. 4,994,988, entitled PRINTER HAVING A MULTIMODE CONTROL PANEL SELECTIVELY MANIPULATABLE BETWEEN VARYING MODES OF OPERATION, issued to Yokoi on Feb. 19, 1991, the complete disclosure of which is incorporated herein by reference, uses mechanical means to provide different hard labels for each of two different modes of operation. Yokoi provides multiple function switches on a control panel, each of the switches having a different function for each mode of operation. A first set of hard labels are provided on the control panel adjacent each switch, each label indicating the function of the adjacent switch relative to the first mode of operation. A second set of hard labels are provided on a "lid" hinged to swing into position over the first set of hard labels (and the switches). The lid includes mechanical means for controlling the current mode of the printer device and for changing the current functionality of the switches to match the current operational mode of the printer device. Although the Yokoi device provides multifunctionality and variable labeling in a hard labeled device, it fails to provide for upgrades and additional features or functions beyond those originally programmed into the device.

Soft labeling can provide the variable functionality needed for introducing upgrades and additional features or functions into a device. U.S. Pat. No. 5,144,115, entitled TRANSACTION INQUIRING METHOD AND APPARATUS, issued to Yoshida on Sep. 1, 1992, the complete disclosure of which is incorporated herein by reference, discloses a form of "on-screen" or "soft" labeling in the context of an automated teller machine for banking transactions. The soft labels are displayed on a touch-sensitive screen and the function corresponding to each of the touch-sensitive switches varies depending upon the current mode of operation. Other machines use soft labeling in connection with off-screen switches or control keys. For example, U.S. Pat. No. 5,633,912, entitled MOBILE TELEPHONE USER INTERFACE INCLUDING FIXED AND DYNAMIC FUNCTION KEYS AND METHOD OF USING SAME, issued to Tsoi on May 27, 1997, the complete disclosure of which is incorporated herein by reference, discloses multiple off-screen keys each associated with soft labels displayed on an adjacent display screen of a mobile telephone handset. The soft-labeled keys are operative to access corresponding function labels relevant to the current operative mode or "context" of a user interface. The Tsoi device further combines the soft-labeled keys with a standard 10-key pad, each key having a fixed function designated by a hard label fixed thereon.

While soft labeling can provide the variable functionality needed for introducing upgrades and additional features or functions into a device, the label requires display space. Whether associated with on-screen touch-sensitive switches or off-screen mechanical switches, the soft label uses up valuable display space, often requiring up to 20% of the screen to display static control legends.

Thus, each of the known labeling methods, hard labeling and soft labeling, have serious limitations for use in a dynamically changing application displaying large quantities of information on a size-constrained display screen. What is needed is switch labeling method that provides maximum design flexibility and a secure path for introducing upgrades and additional features or functions into a device, without claiming the available display space.

SUMMARY OF THE INVENTION

The present invention overcomes the limitations of the prior art by providing a switch labeling method that provides maximum design flexibility and a secure path for introducing upgrades and additional features or functions into a device, without claiming the available display space, and a device embodying the switch labeling method. The method and device of the present invention overcome the limitations of the prior art devices by providing a combination of both "Secret Until Lit" labeling and soft labeling for use in a dynamically changing application capable of displaying large quantities of information on a display screen having size constraints.

According to one aspect of the invention, the present invention provides a user interface for use in a multifunctional display, the user interface includes one or more operational mode selection keys coupled to select different ones of multiple operational modes accessible by the user, and one or more function control keys electrically coupled with a selected operational mode. A Secret Until Lit label is electrically coupled with each function control key. When an associated operational mode is selected, the Secret Until Lit label is illuminated and presents a context sensitive function legend that defines the control key's function relative to the selected operational mode. The interface also includes an on-screen soft label electrically coupled with each function control key. When a second different operational mode is selected, the Secret Until Lit label is extinguished and the soft label is activated. The activated soft label presents a context sensitive function legend that defines the control key's function relative to the currently selected second operational mode. Thus, each of the Secret Until Lit labels and the on-screen soft labels are visible only when an associated operational mode is selected.

According to various aspects of the invention, the Secret Until Lit labels are positioned on a face of the function control key and/or on a panel surface of the multifunctional display nearby the function control key. Multiple independent sets of Secret Until Lit labels are optionally positioned on or nearby the function control keys. Each set of Secret Until Lit labels defines the functions of the function control keys relative to a different operational mode. Therefore, each independent set of Secret Until Lit labels is illuminated when the associated operational mode is selected. This activation of the independent sets of Secret Until Lit labels is driven by either a software command or a hardware switch.

According to other aspects of the invention, multiple operational modes include the on-screen soft labels. Thus, independent sets of soft labels associated with different operational modes appear on the display screen and define the functions of corresponding function control keys relative to the currently selected operational mode. The soft labels appear under the control of a software or hardware command.

According to other aspects of the invention, the secret until lit labels include a structure formed of substantially rigid transparent plastics material, such as a Perspex or acrylic block, having a first entry face and an opposing exit face and a label positioned proximately to the exit face. An illumination source, such as a light emitting diode, is mounted proximately to the entry face. The illumination source is coupled to one operational mode and generates illumination responsively to selection of that operational mode. According to some aspects of the invention, a light diffuser is positioned between the exit face and the label. According to other aspects of the invention, the label act as the light diffuser.

According to one aspect of the invention, the method of the invention for independently defining one or more control keys in a multifunctional display relative to a plurality of independent operational modes includes presenting a first context sensitive function legend relative to a first selected one of the multiple operational modes by illuminating a secret until lit label; and presenting a second context sensitive function legend relative to a second selected one of the multiple operational modes by illuminating a soft label. Preferably, the first context sensitive function legend defines a function of a control key relative to the first selected operational mode; and the second context sensitive function legend defines a function of the same control key relative to the second selected operational mode.

Preferably, the multifunctional display includes multiple control keys. In such circumstance, the secret until lit label is one of multiple secret until lit labels, each secret until lit label presenting one of several context sensitive function legends associated with respective control keys. Furthermore, the soft label is one of multiple soft labels, each soft label presenting one of several context sensitive function legends associated with respective ones of the same control keys. The control keys are preferably positioned nearby the display screen of the multifunctional display and the various soft labels appear on the display screen in positions clearly associative with their respective control keys. The Secret Until Lit labels are positioned on the panel of the multifunctional display in positions clearly associative with their respective control keys. Alternatively, the Secret Until Lit labels are positioned on the surface of the respective control keys. However, the various possible positions of the Secret Until Lit labels are not mutually exclusive.

According to other aspects of the invention, Secret Until Lit labels are optionally positioned both on and around the respective control keys. The various Secret Until Lit labels are grouped in set of multiple labels, each set of labels identifying the functions of respective control keys relative to a different operational mode. All of the Secret Until Lit labels and on-screen soft labels are electrically coupled to their respective operational modes in such manner that the labels identifying the functions of the corresponding function control keys are activated in response to selection of the respective operational mode.

According to one aspect of the invention, the invention is practiced in combination with an multifunctional display having a size-constrained display screen. Preferably, the multifunctional display is practiced in combination with an FAA certified multifunctional display operating multiple different but complementary avionics operational modes, including, for example, navigation, storm warning, weather radar, terrain advisory, flight information and serial communications to VHF radio Communication/Navigation receivers.

Accordingly, the multifunctional display labeled according to the invention provides sufficient information to the pilot in a format that is readily observed and understood. Thus, the combination labeling of the invention allows the pilot/user to act in a timely manner to protect the aircraft from entering an area of danger.

According to another aspect of the invention, when the invention is practiced in multiple different but complementary avionics operational modes, each operational mode is operated by a separate processor board containing a microprocessor, memory and input/output interface, each said processor board operating operational mode software; and a video data bus interconnects each said separate processor board under the control of a system superintendent. Preferably, the system superintendent is one of the various separate processor boards, for example, the navigation operational mode processor board.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 illustrates a preferred embodiment of the invention using a formed plastic block to form the light collecting and directing device;

DETAILED DESCRIPTION OF PREFERRED EMBODIMENT

Figure 1A:
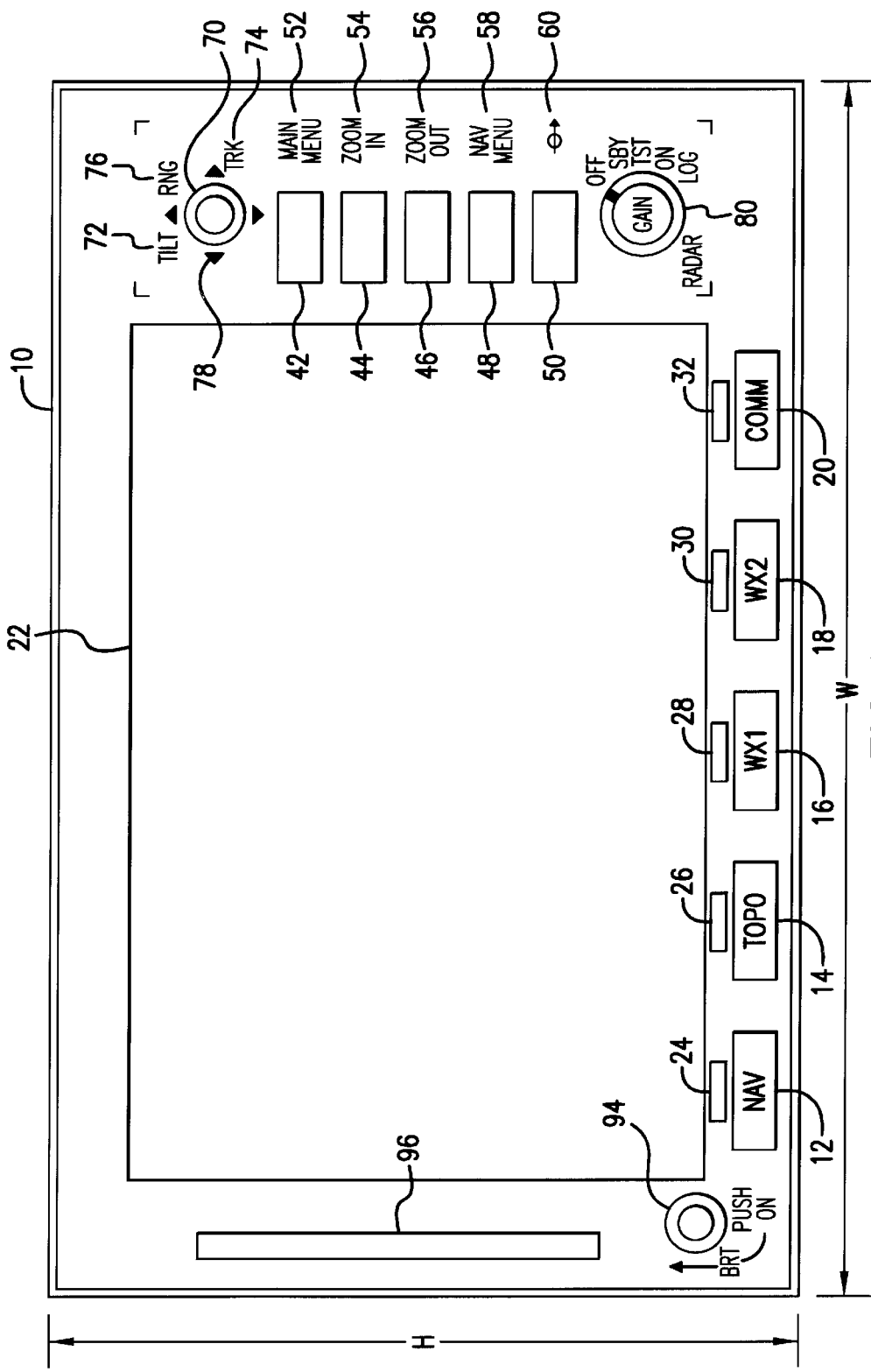
FIGS. 1A and 1B together illustrate the combination labeling of the invention, which provides maximum utility of the available display area of a multifunctional display device by utilizing "Secret Until Lit" ("SUL") labeling, while providing the flexibility of soft labeling when the displayed information leaves sufficient screen space for soft key labels.

In the Figures, like numerals indicate like elements.

The present invention is a method and apparatus for labeling one or more control keys, knobs or switches positioned adjacent to a display screen using a combination of both "Secret Until Lit" hard labeling and soft on-screen labeling with a single control, whereby maximum design flexibility and a secure upgrade path are provided along with a clear and unambiguous user interface. The combination labeling of the invention provides maximum utility of the available display area through utilization of hard labeling, while providing the flexibility of soft labeling when the displayed information leaves sufficient screen space for soft key labels. The combination labeling of the present invention provides both hard labeling on and/or near a control key and alternative soft on-screen labeling adjacent to the same control key. Either the hard or soft label is activated exclusive of the other label. Each label set is activated in connection with an operational mode of the display device, and each label indicates the function of the adjacent control key relative to the currently selected mode of operation.

Hidden or "Secret Until Lit" ("SUL") labeling is generally known in the art and are described in detail below. In SUL labeling, one or more labels are placed on or near a control key. The labels are the same color as the control key or the housing surface surrounding the control key, respectively, and are completely invisible to the human eye until activated. The label is activated by backlighting: a light, such as an light emitting diode ("LED"), positioned behind the label is activated, and the label becomes visible. The visible label provides a legend indicating the function of the associated control key relative to the currently selected operational mode of the multifunctional display. Alternatively, when activated exclusive of the SUL labels, the on-screen soft labels provide legends indicating the function of the associated control keys relative to another different current operational mode of the multifunctional display.

Preferably, the SUL labels indicate the functionality of the control keys relative to one or more "SUL legend" operational modes using essentially all of the display capacity of display screen 22 for optimal display of associated function graphics. Onscreen labels provide legends that indicate the functionality of associated control keys relative to one or more other "soft legend" modes of operation, which have function graphics that are effectively displayed using less than all of the display capacity, of display screen 22. Thus, in an SUL legend operational mode, control keys 42 through 50 are labeled using SUL labels 52 through 60 and 72 through 76 on the panel surface of display 10, thereby allowing full use of display screen 22 for function graphics. And in a soft legend, soft onscreen labels to indicate the functionality of the associated control keys relative to selected modes of operation, as described in detail below.

FIG. 1A is an exemplary illustration of the invention in connection with a multifunctional avionics display. The exemplary illustration herein is not intended to limit the scope of the invention in any way, but rather is intended to describe the invention in a meaningful and useful context. The invention is equally useful in various alternative multifunctional display applications that provide multiple operational modes having a clear and unambiguous user interface and yet require design flexibility and upgrade potential, such as vending machines, automatic teller banking machines, multifunctional automotive displays and the like. Each of these alternative embodiments is similarly intended to be within the scope of the claims to the present invention.

In FIG. 1A a multifunctional avionics display 10 preferably provides multiple functions in various associated operational modes. Such operational modes are exclusively selected by means of a control, such as control keys 12, 14, 16, 18, and 20 aligned along the bottom of display screen 22. When multifunctional display 10 is operational, pressing or flipping one of control keys 12 through 20 activates an associated operational mode, such as navigation mode 12, topographical mode 14, first weather mode 16, second weather mode 18, and communications mode 20. Preferably, indicator lights 24, 26, 28, 30 and 32 provided on the display panel are associated with respective ones of control keys 12, 14, 16, 18, and 20, as shown, and indicate which operational mode is currently selected. Alternatively, each of control keys 12 through 20 includes illumination sources that are normally illuminated and are deactivated when the represented operational mode is selected. According to another alternative embodiment, each of control keys 12 through 20 includes illumination sources that are normally dark and are illuminated when the represented operational mode is selected. According to yet another alternative embodiment of the invention, selection of operational mode is controlled by a single control key that, by repeated operation, toggles through the various different operational modes available to the user.

Multifunctional display 10 also includes multiple control keys or switches 42, 44, 46, 48, and 50. Each control key 42 through 50 provides a function relative to a currently selected operational mode of multifunctional display 10. A Secret Until Lit or "SUL" legend 52, 54, 56, 58, 60 is associated with a respective one of each control key 42, 44, 46, 48, and 50, as shown. As described herein, each of SUL legend 52 through 60 is invisible to the human eye until activated. During normal operation of multifunctional display 10, each of SUL legend 52 through 60 is invisible. When an associated operational mode is selected, each SUL legend 22 through 30 is illuminated or backlit by a simultaneously activated light source, such as a LED (not shown). In preferred embodiments, backlighting illuminates the labels, which become visible on the panel face adjacent to corresponding control keys 42 through 60.

FIG. 1A also illustrates the SUL legends in connection with a joystick 70. In FIG. 1A, joystick legends such as TILT 72, TRK 74, RNG 76 are present in SUL legend form, and one or more directional arrows 78 are present in hard label form to explain the functions of joystick 70 relative to a currently selected operational mode. FIG. 1A also includes traditionally hard labeled two-gang rotary control 80 having a first gain control key and a second function control key. Each of the gain control function legend, located on the body of two-gang rotary control 80, and function control legends, located adjacent to two-gang rotary control 80, are traditional hard labeled legends appearing in permanent markings on the face of multifunctional display 10.

Secret Until Lit (SUL) Labels

The "Secret Until Lit" or "SUL" technique of labeling is embodied in a number of possible forms. A few examples are described below. These exemplary illustrations are not intended to limit the scope of the invention in any way, but rather are intended to describe the invention in meaningful and useful contexts. The invention is equally practicable in various alternative embodiments. Each of these alternative embodiments is similarly intended to be within the scope of the claims to the present invention.

Preferably, the SUL legends are considerably brighter than the information displayed on display screen 22 and is viewable from at least the same angle as display screen 22. Typical color liquid crystal display ("LCD") screens have a face-on brightness of only about 110 foot Lambert and a viewing angle of about 30 degrees. Thus, the SUL legends are preferably viewable from an angle in excess of about +/−30 degrees from straight-on, i.e., a viewing angle in excess of about 30 degrees. Furthermore, the SUL legends are preferably easily legible at a normal viewing distance from the face of multifunctional display 10. Sufficiently clear and unambiguous information in an easily legible format is possible using SUL legends approximately 2.5 mm high by 10 mm long. For clarity, the legends are evenly illuminated, i.e., without bright spots.

The light source for illuminating SUL labels 52 through 60 and 72 through 76 is preferably a bright, low power, and low cost light source, such as a light emitting diode or "LED." The brightest white LEDs available at present area conventional 5 mm leaded design manufactured by Nichia capable of producing a brightness on the order of 4000 mcd with a viewing angle of 20 degrees. Thus, an ultra-bright LED achieves the preferred brightness only with a relatively narrow viewing angle. Furthermore, illumination using a single LED tends to produce a central spot of bright light with immediate loss of brightness around the periphery and a restricted viewing angle. Therefore, in a preferred embodiment, the invention includes a light collecting and directing device to illuminate the text and graphics of the SUL legends.

According to the invention, the light collecting and directing device includes a body formed of a substantially rigid transparent material and having at least an entry face and an exit face interconnected by the body such that a substantial amount of light injected into the entry face impinges upon the exit face. The substantially rigid body is preferably formed of a block of Perspex or other substantially rigid transparent plastics material such as acrylic and, as a consequence, is inexpensive. Such uses of Perspex or other substantially rigid transparent plastics material are generally known in the art, as described in U.S. Pat. No. 4,696,535, entitled APPARATUS FOR INJECTING LIGHT THROUGH A BUFFER-COATED OPTICAL FIBER INTO THE CORE THEREOF AND ITS USE IN OPTICAL FIBER SPLICING, issued to Saha on Sep. 29, 1987, the complete disclosure of which is incorporated herein by reference.

FIG. 2 illustrates a preferred embodiment of the light collecting and directing device. In FIG. 2 a block of clear glass or plastic forms the light collecting and directing device. Light collecting blocks 81 are formed of any visually transparent material such as glass or plastic capable of being polished to a high gloss. For example, commercially available Perspex, clear acrylic, or another suitable material is machined or molded to form light collecting blocks 81. Light collecting blocks 81 are preferably formed in cubic or other rectilinear shape having essentially planar orthogonal faces. Light injected through an entry or LED face 81A into the body of light collecting block 81 is directed or reflected towards an exit surface or SUL face 81B by substantially planar intervening faces 81C, 81D, 81E, and 81F. LED face 81A is preferably of substantially planar form, and preferably, LED face 81A and intervening faces 81C, 81D, 81E, and 81F are contiguous the one with the other. SUL face 81B is preferably essentially parallel with LED surface 81A and the two surfaces are spaced apart by the intervening structure of body 81. SUL face 81B is also preferably of substantially planar form and preferably contiguous with each of intervening faces 81C through 81F. According to the preferred rectilinear embodiment, intervening faces 81C through 81F are preferably orthogonal to one another and to each of LED face 81A and SUL face 81B. Optionally, light collecting blocks 81 are angled or tapered by known methods to a reduced size at entry or LED face 81A to reduce light loss. The optional angling of light collecting blocks 81 also ensures that at least a major proportion of light injected through entry face 81A into the body will be directed or reflected towards exit surface SUL face 81B. The angle ALPHA ($\alpha$) between these faces preferably lying within the range 0° degree for the preferred rectilinear configuration to as much as 45° degrees for a tapered configuration Light collecting blocks 81 are highly polished on all outside faces except the top face adjacent to the SUL label, i.e., SUL face 81B. Polishing forms reflective surfaces on intervening faces 81C through 81F, which act like a light tube to internally reflect injected light between essentially parallel and spaced apart faces 81C through 81F into the "legend" face, SUL face 81B.

According to one optional configuration, light collecting blocks 81 are optionally cut and drilled to a set depth to hold one or more LEDs. The drilled inner recess 81G into which the LED (not shown) is fitted is preferably very highly polished to allow maximum light transfer.

Although described in terms of a block with internally reflective surfaces between essentially parallel and spaced apart entry and exit faces, other forms of light collecting and directing devices capable of collecting and directing light injected into the body at an entry face onto an exit face are also contemplated by the claims of the invention. For example, light tubes, optical fibers, and other light collector/conductor devices are contemplated.

Preferably, a diffuser is interposed between the exit surface or SUL side 81B of the light collecting block and the SUL legend to obtain a reasonably even spread of light across the legend. The diffuser preferably diffuses the light sufficiently to evenly illuminate the full surface of SUL face 81B of light collecting block 81 without reducing the brightness to the extent that the legend is not viewable in direct sunlight.

According to preferred embodiments of the invention, each of light collecting blocks 81 is visually isolated from its neighbors to prevent light leakage between adjacent blocks. Preferably, light collecting blocks 81 are enclosed inside individual tubes (not shown) formed of an opaque material. According to one configuration, the isolation tubes are formed as individual tubes within the casting of the front bezel or front panel of multifunctional display 10. According to various alternative embodiments of the invention, the sides of light collecting blocks 81, except on LED mount side 81A and SUL legend side 81B, are coated using conventional techniques to reduce light loss. SUL side 81B of light collecting blocks 81 is formed with a coarse texture to act as a diffuser. SUL side 81B of the light collecting blocks 81 is formed with a rough surface finish, for example, using course grit emery paper, to provide a lens effect. Experimentation indicates that a circular pattern on this rough surface effectively distributes the light for illuminating the SUL legend evenly with a wide viewing angle. Finished as described, light collecting blocks 81 provided in testing an illumination of 1500 Foot Lambert using the above mentioned LEDs. SUL labels, for example, SUL labels 52 through 60 and 72 through 76, are bonded to SUL legend side 81B of light collecting blocks 81 opposite LED mount side 81A using, for example, a clear RTV adhesive.

As described above, according to one embodiment of the invention, the SUL label is configured using a single one of the abovementioned high brightness white LEDs let into light collecting block 81. According to other embodiments of the invention, multiple LEDs are used such that the overall amount of light is increased and the SUL labels are relatively brighter and more easily viewable in direct sunlight. Accordingly, two of the abovementioned high brightness white LEDs are let into light collecting block 81, thereby providing sufficient brightness for sunlight readability even when the light is diffused by the rough surface finish on SUL legend side 81B of light collecting block 81. The various exemplary configurations described below are intended to illustrate various experimental embodiments of the invention, without limitation on the scope of the claims that follow.

According to one embodiment of the present invention, two LEDs are placed hard up behind a 1.5 mm thick spark etch finish diffuser without an intervening light collecting block 81. This embodiment provides a very brightly and evenly illuminated legend, which is highly viewable within a viewing angle of about 10 degrees, even in direct sunlight.

According to another alternative embodiment of the invention, two LEDs are placed at a distance, such as 27 mm, behind a 1.5 mm thick spark etch finish diffuser without an intervening light collecting block. This embodiment provides a very brightly and evenly illuminated legend, which is highly viewable, even in direct sunlight, but only within a viewing angle of less than 10 degrees.

According to still another alternative embodiment of the invention (not shown), two LEDs are positioned to shine along a reflective tube into a diffuser. For example, two LEDs are positioned to shine along a 31 mm×6 mm×10 mm reflective tube into a 1.5 mm thick spark etch finish diffuser. This embodiment provides a very bright and even illumination of the legend as viewed from directly ahead, i.e., at a small viewing angle. This embodiment also provides a bright and even illumination of the legend within a useful viewing angle, apparently because the light rays from the LEDs are reflected from the polished parallel sides of the tube, which causes the bright light to be viewable from a much wider angle.

According to another alternative embodiment of the invention, two LEDs are let into one end of a 31 mm×6 mm×10 mm polished light collecting block 81 having a diffuser 81H on the opposite end. Diffuser 81H is, for example, a spark etch finish diffuser. The internal surfaces of light collecting block 81 act as a reliable and consistent reflector that achieve the same results achieved with the abovementioned reflective tube. The action of setting the LEDs into the end of light collecting block 81 tends to destroy the lens characteristic of the domed end of the LEDs, such that when viewed from head-on, the LEDs appear as tiny points of light rather than large, bright light sources. The expected magnification and focus i.e., lens effect, normally provided by light collecting block 81 tends to dissipate due to the effective re-profiling of the lens on the end of each of the LEDs.

According to still another alternative embodiment of the invention, two LEDs are positioned at entry surface 81A of polished light collecting block 81 having diffuser 81H positioned at the opposite surface, SUL side 81B. For example, two LEDs are butted up against one surface of a 27 mm×6 mm×10 mm polished light collecting block having a spark etch finish diffuser on the opposing surface. According to this configuration, the full brightness and magnification provided by the LED lens are maintained and light collecting block 81 acts as an effective light guide, reflector and diffuser. This alternative embodiment includes various alternatives of the interface between light collecting block 81 and the SUL label.

The alternative interfaces include: (A) butting the SUL label up against the spark etched end of light collecting block 81; (B) bonding the SUL label against the spark etched end of light collecting block 81 using a clear RTV adhesive; (C) polishing away the spark etch finish and butting the SUL label up against the polished end of light collecting block 81, using the SUL label as a diffuser; and (D) polishing away the spark etch finish and bonding the SUL label onto the polished end of light collecting block 81 using a clear RTV adhesive, again using the SUL label as a diffuser.

Alternative (A) provides high brightness at a wide viewing angle. Alternative (B) provides higher brightness relative to alternative (A) up to about a 30 degree viewing angle; thereafter, alternative (B) provides about the same brightness as alternative (A). Alternative (C) provides high head-on brightness relative to alternatives (A) and (B), but the light tends to be "patchy" and the viewing angle drops off sharply, apparently due to lack of diffusion. Alternative (D) provides the highest head-on brightness relative to alternatives (A), (B) and (C), but at a limited viewing angle.

During testing of alternatives (A) through (D), the SUL label was plain label material, i.e., no printed text nor graphics, such that realistic readings over the viewing area of the legend were possible.

Results of light intensity measurements during testing of alternatives (A) through (D) are shown below in TABLE 1. All light readings are in foot Lambert.

TABLE 1

| Viewing Angle | A. Spark etch diffuser; SUL legend not bonded | B. Spark etch diffuser; SUL legend bonded | C. Polished; SUL legend not bonded | D. Polished; SUL legend not bonded |
| --- | --- | --- | --- | --- |
| −45 | 440 | 520 | 380 | 300 |
| −30 | 1200 | 1200 | 1200 | 1000 |
| −20 | 2750 | 4200 | 3300 | 2600 |
| 0 | 9300 | 15500 | 16700 | 20000 |

TABLE 1-continued

| Viewing Angle | A. Spark etch diffuser; SUL legend not bonded | B. Spark etch diffuser; SUL legend bonded | C. Polished; SUL legend not bonded | D. Polished; SUL legend not bonded |
|---|---|---|---|---|
| 20 | 2750 | 4200 | 3300 | 2600 |
| 30 | 1200 | 1200 | 1200 | 1000 |
| 45 | 440 | 520 | 380 | 300 |

Figure 3:
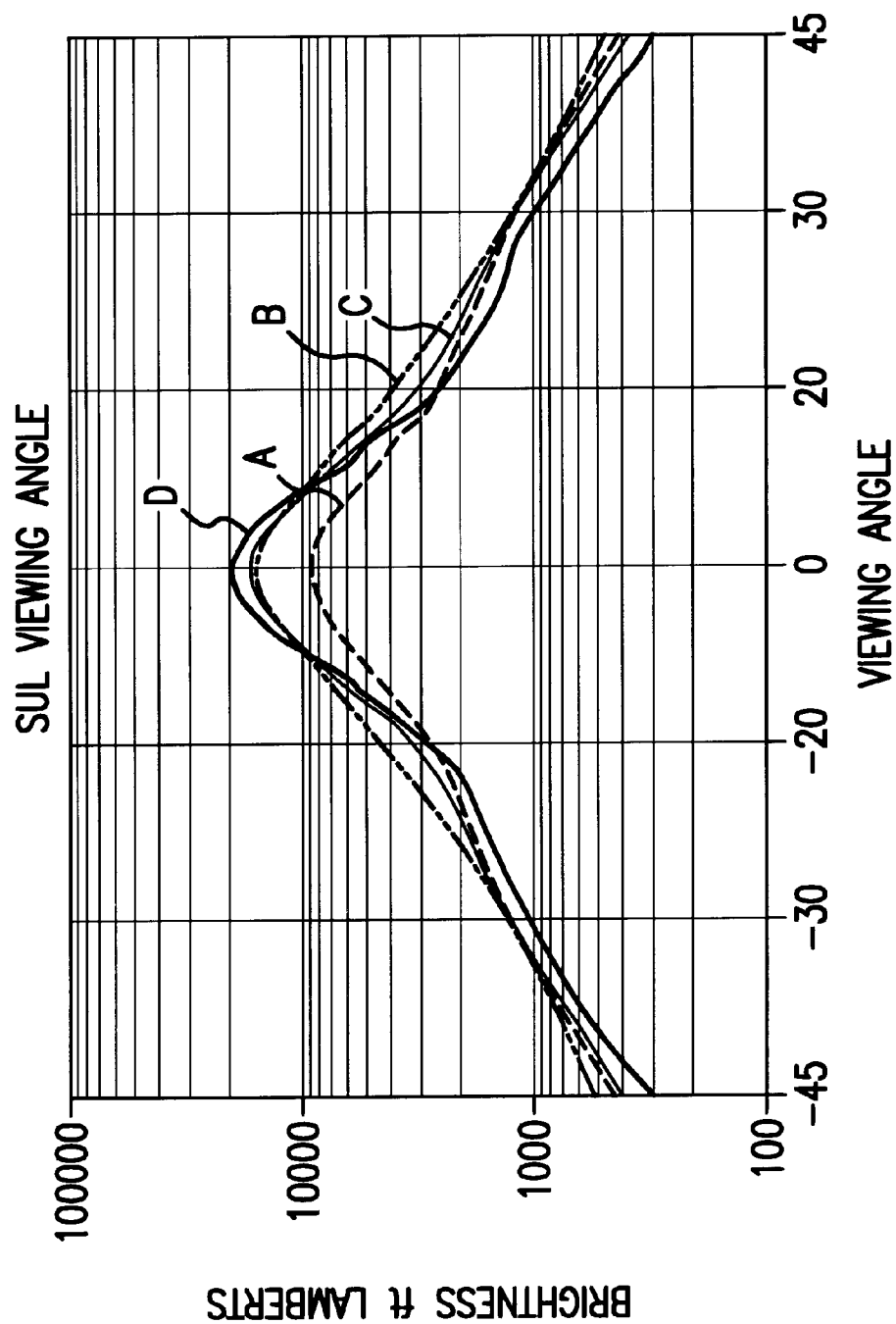
FIG. 3 is a graphical representation of the results of testing performed using various interfaces between a light collector and the "Secret Until Lit" label.

The test results outlined in TABLE 1 are graphically represented in FIG. 3. In FIG. 3 the various curves, A, B, C, and D, represent the results of testing the brightness, in Foot Lambert, relative to viewing angle, in degrees, of alternatives (A) through (D).

Light collecting blocks 81 used in testing were 6 mm thick and the SUL legends were only 2.5 mm high. During testing, a 12 o'clock or head-on viewing angle was improved by placing the legends slightly above the center line of the block. This improved viewing is the result of the block being viewed from above, whereby the reflection of the LEDs in the bottom face of light collecting block 81 appears to be slightly above center. Therefore, the SUL legend is preferably positioned slightly above centerline such that the 12 o'clock viewing angle is optimized.

In addition to the above testing, a series of live tests were carried out with option (A) in bright direct sunlight conditions, both in the open and in an automobile. In all tests, the SUL legends were clearly viewable from all angles likely to be experienced in an aircraft installation.

Alternative (A) may be preferred because the need for bonding the lighting block, i.e., light collecting block 81, to the rear of the SUL label is eliminated. Preferably, the lighting blocks are positioned such that the SUL legends lie slightly above centerline. Preferably, the SUL illumination sources, i.e., the LEDs, have a 1000:1 dimming ratio such that night time visibility is acceptable. The actual LED brightness range is determined by experimentation in the practical application and adjusted for production by a combination of resistor selection and software. Such adjustment is believed within the skill of those of ordinary skill in the art, without undue experimentation.

On-Screen Soft Labeling

Secret Until Lit or "SUL" labels 52 through 60 and 72 through 76 are placed in certain key positions on the front panel of multifunctional display 10. For example, SUL labels 52 through 60 and 72 through 76 beside control keys 42 through 50 and joystick 70, respectively. These SUL keypad annotations illuminate only when control keys 42 through 50 and joystick 70 are set via software command or hardware switch to operate the functions associated with a selected operational mode of multifunctional display 10, preferably a primary operational mode of multifunctional display 10. Other functions of the same control keys 42 through 50 and joystick 70 are defined relative to one or more other operational modes via a soft key approach. That is, the associated keypad annotation appear in the form of "key style" graphics on main display screen 22.

Accordingly, each SUL label 52 through 60 and 72 through 76 is only visible when a light source positioned behind the label is lit via a software or hardware command. When the light source or LED is not activated, the SUL label is the same color as the surrounding front panel material and is invisible. The light source or sources (not shown) illuminating SUL labels 52 through 60 and 72 through 76 are under software or hardware control, and are active only when the functions of control keys 42 through 50 are active in the "SUL legend" mode. Thus, in the SUL legend operational mode, control keys 42 through 50 are labeled using SUL labels 52 through 60 and 72 through 76 on the panel surface of display 10, thereby allowing full use of display screen 22 for function graphics. In other "soft legend" operational modes, the SUL light sources, i.e., the LEDs, are deactivated or switched "off," and the corresponding functions of control keys 42 through 50 and joystick 70 are explained by on-screen soft labels.

Figure 1B:
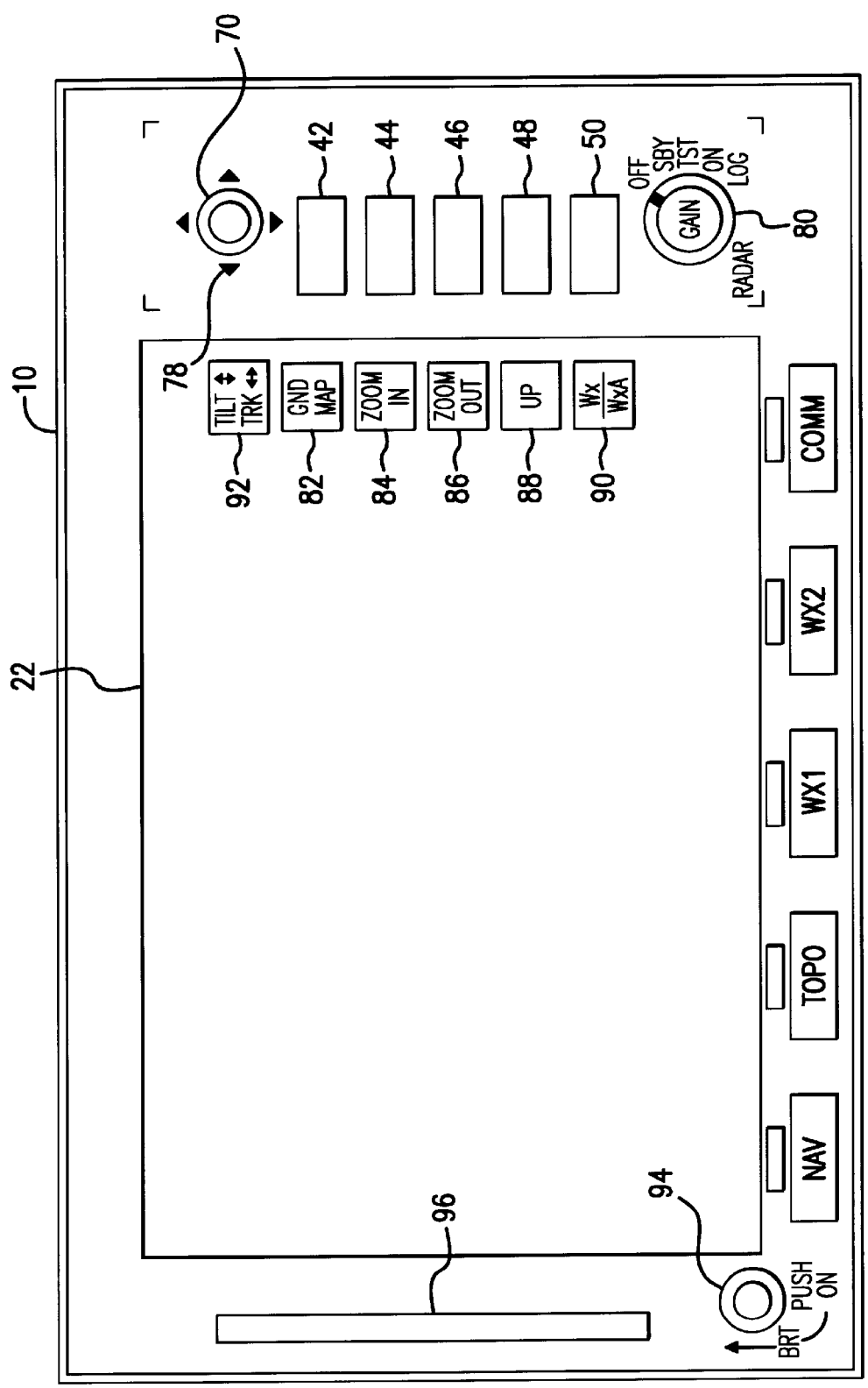

FIG. 1B illustrates the condition wherein multifunctional display 10 is active in a "soft legend" or other operational mode, other than an SUL legend operational mode. Such "soft legend" modes as used herein refer to operational modes having graphical display screens that afford space on main display screen 22 for one or more on-screen soft labels, without interfering with the information intended for display. In a preferred avionics multifunctional display described herein, such "soft legend" operational modes include, for example, a Topographic operational mode 14, a weather radar operational mode 16, a conventional Storm-Scope operational mode 18, and/or a communications control operational mode 20, each of which are described below. Such other operational modes are often considered "secondary" to the "primary" Navigation mode in an avionics multifunctional display. In such secondary or "soft legend" operational mode, the functions of control keys 42 through 50 and joystick 70 corresponding to a currently selected operational mode are defined by on-screen soft labels. For example, on-screen soft labels 82 through 90, and 92 positioned on-screen beside control keys 42 through 50 and joystick 70, respectively. On-screen soft label annotations appear only when control keys 42 through 50 and joystick 70 are set via software or hardware to operate the functions associated with a selected operational mode of multifunctional display 10, preferably one of the secondary or other operational modes other than the primary operational mode. That is, the associated keypad annotation appear in the form of "key style" graphics on main display screen 22.

Additional Alternative Embodiments

Figure 4A:
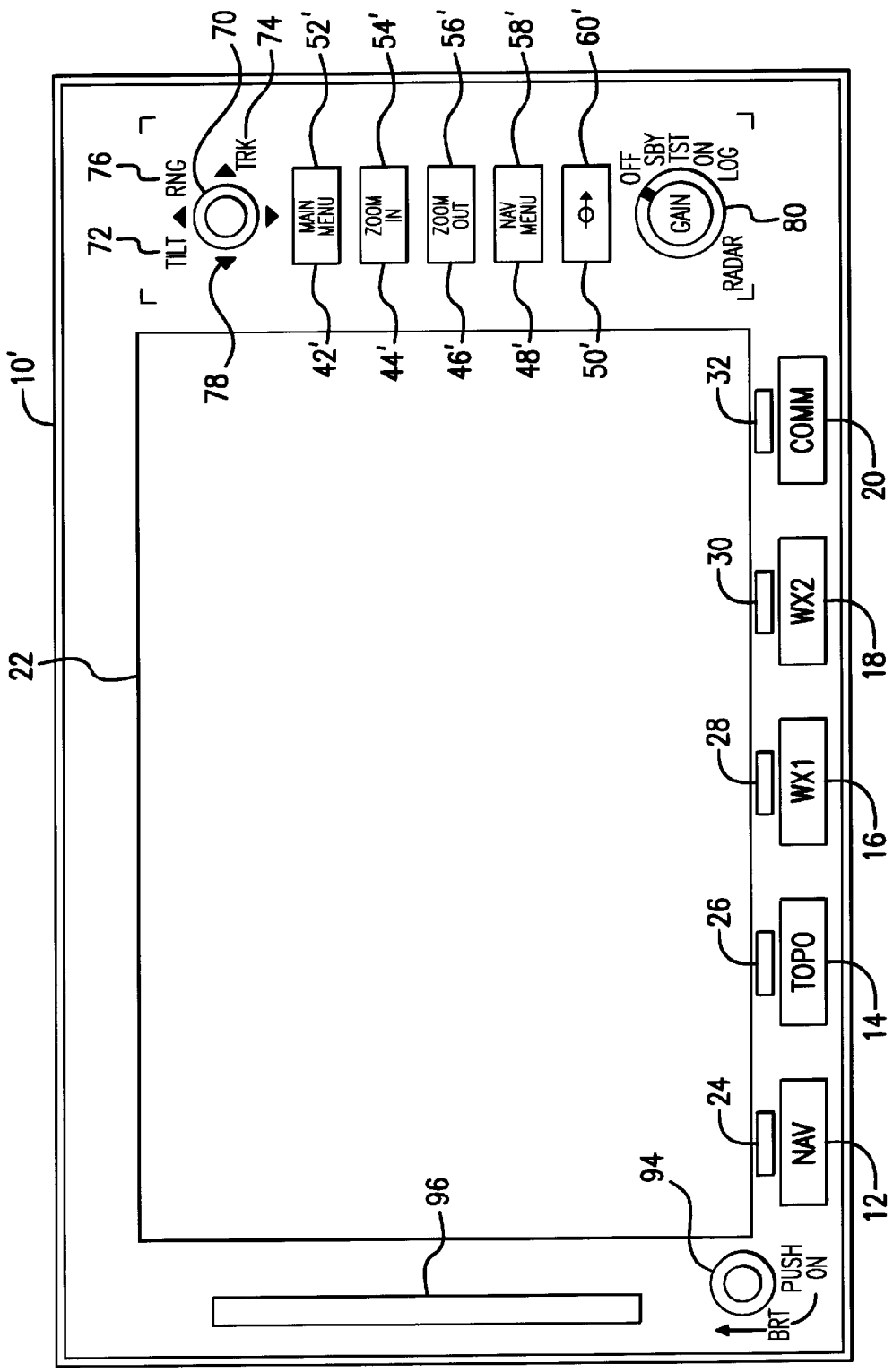
FIGS. 4A and 4B together illustrate one alternative embodiment of the combination labeling of the invention, wherein the legends appear on the control key faces.
Figure 4B:
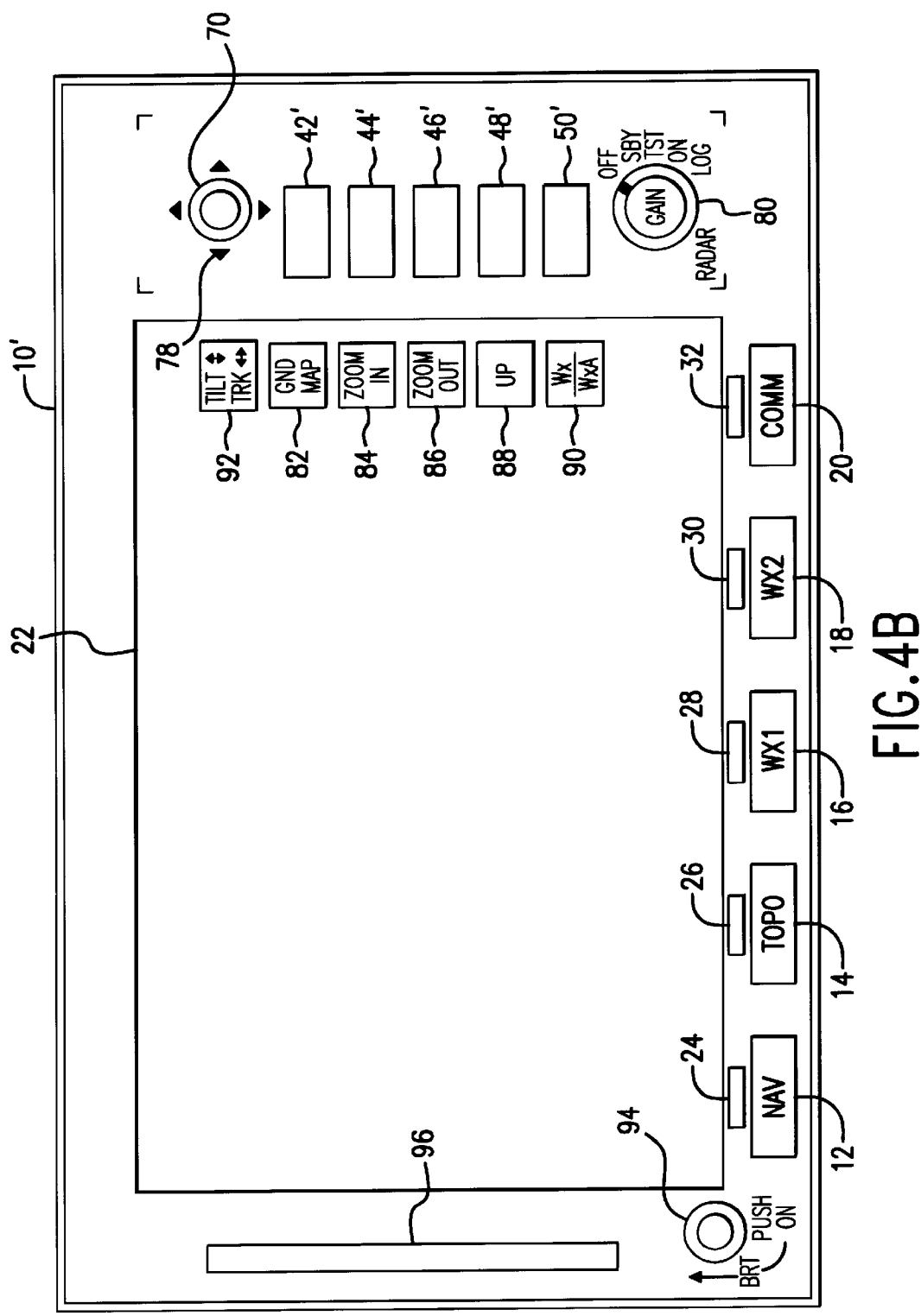

FIGS. 4A and 4B illustrate alternative embodiments of the combination labeling of the invention. In FIG. 4A a multifunctional avionics display 10' preferably provides multiple functions in various associated operational modes, which are exclusively selected by means of a control, such as control keys 12, 14, 16, 18, and 20. Multiple control keys or switches 42', 44', 46', 48', and 50' provide functions relative to a currently selected operational mode. Secret Until Lit or "SUL" legends 52', 54', 56', 58', and 60' appear on the face of respective control key 42', 44', 46', 48', and 50', as shown. As described above, each of SUL legend 52' through 60' is invisible to the human eye until activated, i.e., illuminated by backlighting. Backlighting illuminates the labels, which become visible on the faces of corresponding control keys 42' through 50'. Otherwise, each of SUL legend 52' through 60' is unilluminated and, therefore, invisible to the human eye. The light sources for illuminating SUL labels 52' through 60' are preferably bright, low power, and low cost light sources, such as light emitting diodes or "LEDs" magnified and directed to the control key surface by a light collecting block in combination with a diffuser, as described above. These SUL keypad annotations illuminate only when control keys 42' through 50' are set via software command or hardware switch to operate the functions associated with a selected "SUL legend" operational mode of multifunctional display 10, preferably a "primary" operational mode of multifunctional display 10' in a preferred avionics application. Other functions of the same control keys 42' through 50' are defined relative to one or more other "secondary" operational modes via a soft key approach using "key style" graphics on main display screen 22.

Accordingly, each SUL label 52' through 60' is only visible when a light source positioned behind the label is lit via a software or hardware command. When the light source is not activate, the SUL label is the same color as the surrounding control key material and is invisible. The light source or sources (not shown) illuminating SUL labels 52' through 60' are under software or hardware control, and are active only when the functions of control keys 42' through 50' are active in the associated operational mode. Thus, while operating in the associated operational mode, control keys 42' through 50' are labeled using SUL labels 52' through 60' on the control key surface, thereby allowing full use of display screen 22 for function graphics. In other operational modes, the SUL light sources, i.e., the LEDs, are deactivated or switched "off," and the corresponding functions of control keys 42' through 50' are defined by on-screen soft labels.

FIG. 4B illustrates the condition wherein multifunctional display 10' is active in a "soft legend" operational mode, other than the primary operational mode. In such soft legend operational mode, the functions of control keys 42' through 50', and optionally joystick 70, corresponding to a currently selected operational mode are again defined by on-screen soft labels. For example, on-screen soft labels 82 through 90 and 92 positioned on-screen beside control keys 42' through 50' and joystick 70, respectively. These on-screen soft label legends appear only when control keys 42' through 50' and joystick 70 are set via software or hardware to operate the functions associated with a selected operational mode of multifunctional display 10, preferably one of the secondary or other operational modes other than the primary operational mode. That is, the associated keypad annotation appear in the form of "key style" graphics on main display screen 22.

According to another alternative embodiment of the invention, the Secret Until Lit or SUL labeling of both FIGS. 1 and 4 are combined to provide a multifunctional display having two or more "SUL legend" operational modes which are exclusively selected by means of a control, such as control keys 12, 14, 16, 18, and 20. "SUL legend" operational modes are those operational modes in which one or more control keys are labeled using SUL labels on or adjacent to the control key, thereby allowing full use of display screen 22 for function graphics. In preferred embodiments of avionics multifunctional display 10, 10', the "SUL legend" operational modes are the primary use operational modes, for example, the Navigation and/or Topographical operational modes.

Multiple control keys or switches 42, 44, 46, 48, and 50 provide functions relative to a currently selected one of multiple "primary" operational modes, in which SUL legends 52, 54, 56, 58, and 60 define the respective functions relative to different primary operational modes. Control keys or switches 42, 44, 46, 48, and 50 each provide a function relative to a currently selected first "primary" operational mode of multifunctional display 10, as illustrated in FIG. 1 and described above. When the first "primary" operational mode is selected, a software command or hardware switch sets control keys 42 through 50 to perform functions relative to the currently selected mode. Simultaneously, SUL legends 52, 54, 56, 58, and 60 are illuminated and appear on the panel face adjacent corresponding control keys 42, 44, 46, 48, and 50. SUL legends 52 through 60 define the respective functions of corresponding control keys 42 through 50 while the currently selected first mode is operational. Multifunctional display 10 includes capacity to operate a second "primary" function, wherein control keys 42, 44, 46, 48, and 50 are set to perform functions relative to a second "primary" operational mode, such as a Topographical mode versus a first primary Navigational mode. Upon selection of the second "primary" operational mode, SUL legends 52 through 60 defining functions relative to the first "primary" mode are extinguished. Simultaneously, a previously invisible second set of SUL legends 52', 54', 56', 58', and 60' are illuminated and appear on the faces of respective control key 42', 44', 46', 48', and 50', as illustrated in FIG. 4 and described above. As described above, each of SUL legend 52' through 60' define the function of corresponding control keys 42' through 50' relative to the second "primary" function.

In other operational modes, the SUL light sources, i.e., the LEDs, are extinguished or switched "off," and SUL legend sets 52 through 60 and 52' through 60' corresponding respective functions of control keys 42 through 50 associated with the first and second "primary" modes are deactivated. During operation in such other "secondary" modes, functions of control keys 42 through 50 are defined according to a soft legend operational mode by respective on-screen soft labels, as described above.

According to other additional alternative embodiments of the invention, multifunctional display 10 includes three or more exclusively selected "primary" functions in which one or more control keys are labeled using multiple SUL labels on the face of one or more of control keys 42 through 50 and/or multiple SUL labels adjacent to one or more of control keys 42 through 50, thereby allowing full use of display screen 22 for function graphics. According to such embodiments, each one of multiple control keys 42 through 50 performs functions defined relative to a different one of the multiple "primary" operational modes. The currently selected "primary" mode sets the respective functions of each of control keys 42 through 50 and activates a corresponding set of SUL labels on or near control keys 42 through 50 that define their current control functions. Control keys 42 through 50 optionally include two or more sets of independently illuminated SUL legends, which are set by the software command or hardware switch and that define the functions of control keys 42 through 50 relative to the currently selected "primary" mode.

Another two or more sets of independently illuminated SUL legends positioned near or adjacent to control keys 42 through 50 on the panel surface. For example, one individually illuminatable set of SUL legends appears to the right side of control keys 42 through 50, as shown in FIG. 1, while a second set of SUL legends (not shown) are positioned to the left side. Optionally, more sets of individually illuminatable SUL legends are positioned above, below, and/or otherwise in associative proximity to corresponding control keys 42 through 50. Each set of individually illuminatable SUL legends are set by the software command or hardware switch and define the functions of control keys 42 through 50 relative to the currently selected "primary" mode. As described above, functions of control keys 42 through 50 are defined by respective on-screen soft labels during operation in other "secondary" modes.

In preferred embodiments of the invention shown in FIGS. 1 and 4, multifunctional avionics display 10, 10' is an avionics device certified to Joint Technical Standing Order ("JTSO") C113, which is harmonized with the FAA TSO C113, thus providing common certification across Europe and the USA. Multifunctional avionics display 10, 10' is preferably formed as a single piece rack-mounted box. According to one embodiment, the box measures 6.25 inches wide by 4 inches high by 10 inches deep (not shown). Display screen 22 is preferably a conventional 5 inch color display, such as a commercially available Toshiba TFT 5 inch color display. Preferably, "on-off" and "brightness" controls are also provided on the face panel of multifunctional display 10. For example, two-gang push "on-off" and rotate "brightness" control switch 94 is provided in a convenient position beside display screen 22.

Multifunctional display 10, 10' displays graphics related to any of multiple different operational modes. Multifunctional display 10, 10' is either an active display containing a central processing unit ("CPU") operating multiple software algorithms in different operational modes to perform different useful functions, or a passive terminal interactively coupled to such a CPU. Traditionally, multifunctional displays have been personal computer ("PC") based. Two reasons are the need for a large amount of processing horsepower and the perception that the high level languages available for PCs provide a fast track to software development. However, even basic FAA certification of such systems is difficult. Therefore, according to preferred embodiments of the invention, multifunctional avionics display 10, 10' is microcontroller based, preferably using a multiprocessor, also known as a parallel processor. Preferably, each major function or operational mode available on multifunctional avionics display 10, 10' is operated by a separate processor board (not shown) containing a microprocessor, memory and input/output (I/O) interface. Each processor board preferably includes a self-contained suite of software. Each processor board operates continuously, processing its own data and carrying out its own functions. All processor boards transfer data around the system internally on a high speed video data bus interconnecting the various processor boards under the control of a system superintendent. The interconnecting video data bus is preferably of the type disclosed in U.S. patent application Ser. No. 09/525,851, entitled MULTICHANNEL DISPLAY DRIVER SYSTEM, filed on Mar. 15, 2000, in the name of Stephen K. White, and claims the benefit of U.S. Provisional patent application Serial No. 60/152,901 filed on Sep. 8, 1999, the complete disclosures of which are both incorporated herein by reference. Alternatively, the interconnecting data bus is any conventional high speed video data bus suitable for interconnecting the type of processor boards described herein.

Preferably, each processor board includes a boot ROM and a quantity of RAM sufficiently large to operate the intended function. All operating systems and databases are contained within a Personal Computer Memory Card International Association ("PCMCIA") card (not shown) loaded into front loading PCMCIA card device 96, shown in FIGS. 1 and 4. At power-up, each processor board, with the optional exception of a permanent function board, such as a Navigation function board, boots, self tests, then uploads its own operating system and database from the PCMCIA card.

The permanent function board acts as the system superintendent and boots and runs directly out of the PCMCIA card. Thus, database upgrades, system feature enhancements and software corrections and upgrades, and other changes are all achieved by delivering a single PCMCIA card to the end user.

In a preferred avionics application, multifunctional display 10, 10' includes multiple discreet processor boards, which preferably all operate continuously, processing data in parallel in real time and communicating with one another on a high speed video data bus (not shown). Preferably, multifunctional display 10, 10' includes a Navigation and Topography function board operating known software algorithms, which are not part of the present invention. In a preferred avionics application, the Navigation and Topography function board is preferably the primary function of multifunctional display 10, 10' and, therefore, also acts as system superintendent for controlling communications between the various multiple discreet processor boards. Operating known software algorithms, the Topography function preferably displays full color raster scanned 1:500,000 sectional charts with navigation and obstacle overlays, and also provides obstacle warnings. Toggling between the Navigation and Topography function is accomplished by toggling control keys "NAV" 12 and "TOPO" 14. A preferred avionics application also includes a graphics processor board; an avionics interface and data I/O function board; a navigation calculation function board coupled to the Navigation and Topography function board; a Global Positioning System ("GPS") engine, such as a Motorola ("VFR") or an AS P Xpress ("IFR"); and a power supply to provide regulated power to each section of the system.

The graphics processor board is preferably of a designed capable of supporting the layered data provided by the Navigation and Topography function board and the other function boards in the system under the control of the system supervisor. The graphics processor board preferably provides high speed, high quality graphics to display screen 22, and also provides a composite National Television System Committee ("NTSC") video signal output for display on other monitors. The graphics processor board also preferably provides a composite NTSC video input facility to allow multifunctional display 10, 10' to display video images generated from other sources, such as external cameras and other sources producing a video signal.

The avionics interface and data I/O board preferably provides all the outputs to drive external avionics equipment. The avionics interface and data I/O board preferably also accepts and pre-processes all data inputs to multifunctional display system 10, 10' prior to passing the data on to the desired area on the internal high speed bus.

The GPS engine is optional. If present in an avionics application, the GPS engine is preferably selectable to suit the desired level of FAA certification. The Motorola GT OnCore engine supports a Visual Flight Rules ("VFR") level certification. The AS P Xpress engine supports an Instrument Flight Rules ("IFR") level certification.

A preferred avionics application also includes a weather radar function board also operating known software algorithms, which also are not part of the present invention. The presence of the weather radar function board, the "WX1" function indicated by control 16, allow multifunctional display 10 to replace existing weather radar display units present in various aircraft applications. The conventional software operating on the weather radar function board also provides known weather related warnings. Preferably, a conventional StormScope function, the "WX2"

function indicated by control key 18, processes the input from a weather station, for example, a commercially available BFG WX500 black box StormScope, and provides displays and warnings based on such input.

Preferably, an avionics application also includes a communications function board accessible through control key 20 "COMM," which operates a mode that provides serial communication with the aircraft's VHF Communication and Navigation receivers, including remote tuning of the onboard equipment.

Thus, in a preferred avionics application, multifunctional display 10 is primarily a long range navigation device with additional multifunction capability. As discussed above, the preferred primary functions are navigation; topography, incorporating obstacle avoidance; WX1 weather radar; WX2 StormScope; and serial communication with the aircraft's KX 155A Navigation/Communications equipment. In a preferred embodiment, multifunctional display 10, 10' will drop directly into Navigation mode at power-up. Multifunctional display 10, 10' display preferably displays present position and full route or "direct to" navigation details in an Electronic Flight Instrument System ("EFIS")-type format, i.e. black background with aviation related data displayed in color. The functionality in Navigation mode will be much the same as conventional navigation displays, such as the SkymapIIIC available from Skyforce Avionics Limited or a KLN89 available from Honeywell, Incorporated under the brand name Bendix/King.

During operation in the Navigation mode, signals from topographical and weather equipment are being continuously processed and monitored by appropriate processor boards within the system. While operating in the Navigation mode, any warning messages concerning obstacles or weather are displayed on display screen 22. Such messages are optionally annunciated aurally. In response to such message, the operator can select the relevant operational mode through a control key, for example, one of five control keys 12 through 20 positioned along the bottom of display 10, 10'. The currently selected operational mode is indicated by activation of an indicator 24 through 32 corresponding respectively to the selected operational mode.

Multifunctional display 10, 10' also preferably provides the capacity to toggle between any of the five main functions at any time by activating control keys 12 through 20 positioned for convenience along the bottom of display screen 22. The active function is annunciated by illumination, for example, by a LED, of indicator 24 through 32 positioned adjacent to the one of control key 12 through 20 representing the active function.

As described above, the graphics processor board provide multifunctional display 10, 10' with the capacity to layer the various functions on top of each other in certain circumstances to allow better spatial awareness. For example, the navigation information can be laid over the topographical information to allow the pilot to visualize the surrounding terrain. The navigation information can also be laid over the weather radar information or the StormScope information, so that the developing situation is more clearly visible.

Figure 5:
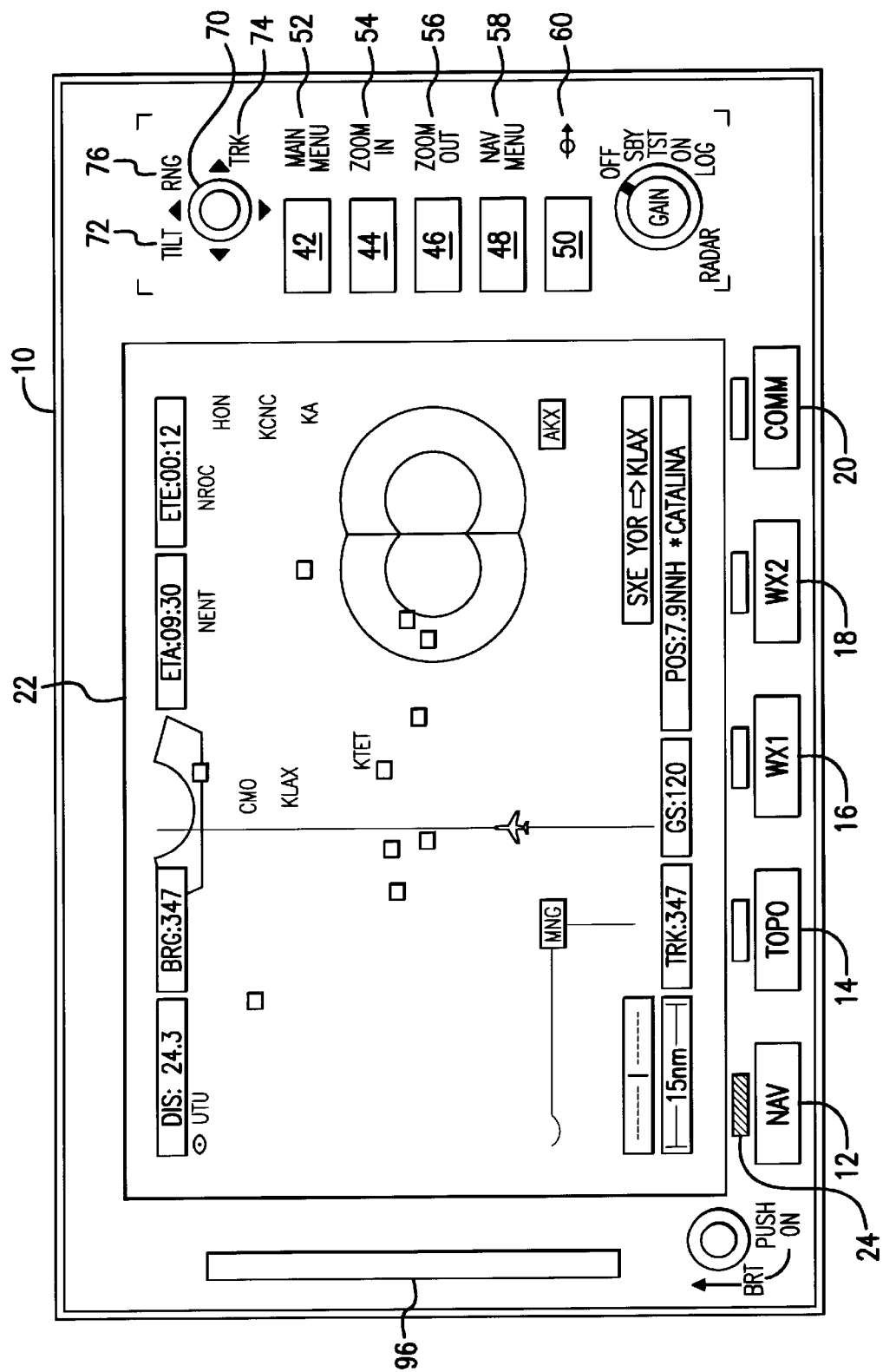
FIG. 5 illustrates the combination labeling of the invention embodied in the Navigation mode of an avionics multifunctional display, wherein the Navigation mode is the preferred primary operational mode of an avionics multifunctional display.

The operational modes: navigation, topography, weather radar, StormScope, and communication, are preferably each supported with relevant setup screens and test functions. There are, for instance, some eighty different screens associated with the Navigation function alone. However, these support screens form no part of the invention and are not detailed herein. FIGS. 5 through 8 illustrate the combination of both SUL labeling and soft labeling of the invention in the context of the various operational modes of a preferred avionics application FIG. 5 illustrates the combination labeling of the invention embodied in the Navigation mode of an avionics multifunctional display, as indicated by an indicator, such as indicator LED 24. Navigation mode 12 is the preferred primary operational mode of an avionics multifunctional display 10. Five control keys 42 through 50 aligned down the right hand side of display screen 22 and joystick 70 have their functions relative to currently selected Navigation mode 12 defined by illuminated SUL legends 52 through 60 and 72 through 76, respectively. Illuminated SUL legends eliminate on-screen soft informational legends, thereby allowing full use of the screen for navigation graphics.

At any time, any one of four operational mode control keys along the bottom of the display can be used to select display alternative operational modes. For example, FIG. 6A illustrates the Topographical mode of a preferred avionics application of multifunctional display 10.

Figure 6A:
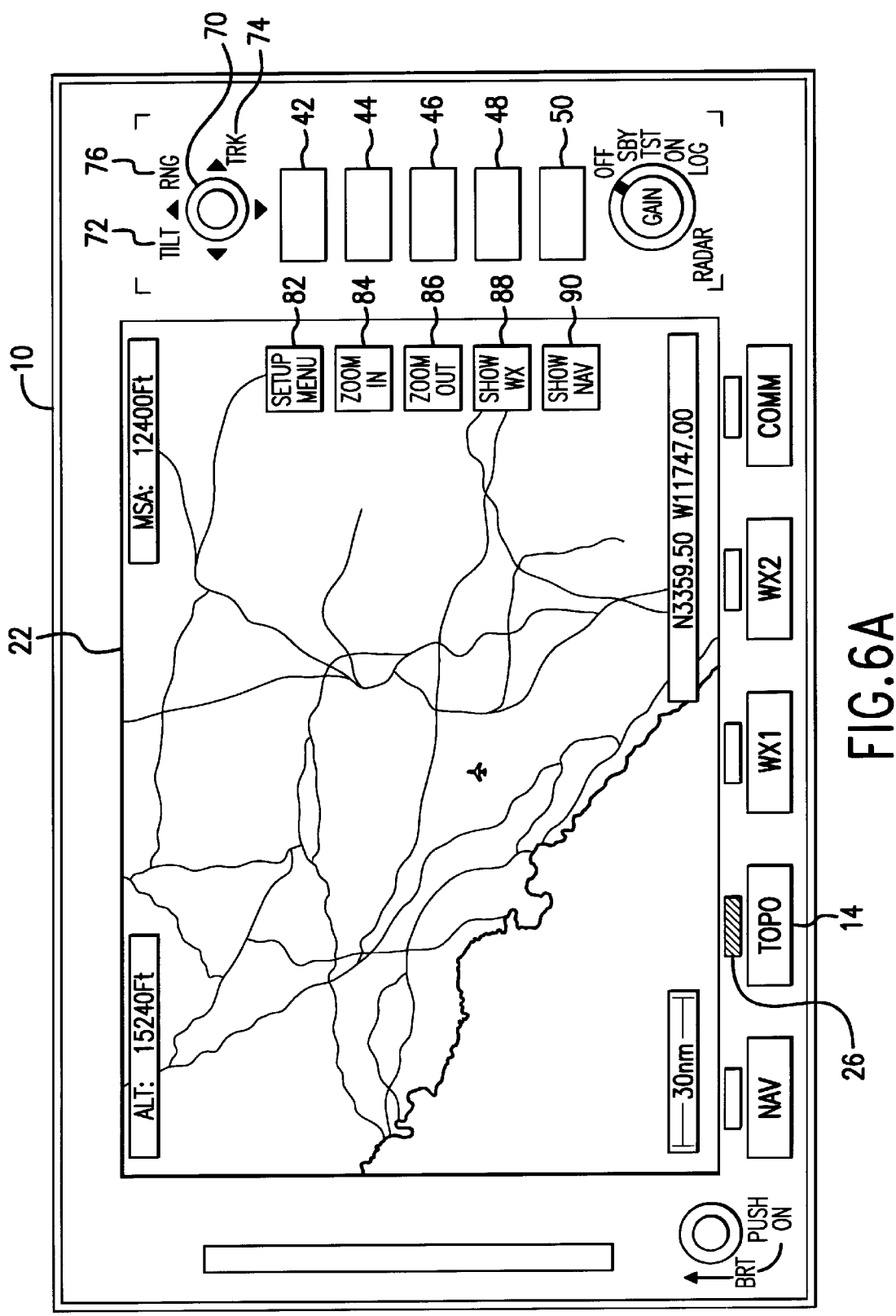
FIG. 6A illustrates one embodiment of avionics multifunctional display of the invention in which the relevant functions of control keys are defined relative to a selected Topographical operation mode using on-screen soft labels.

FIG. 6A illustrates the configuration of multifunctional display 10 when the Topographical mode is selected by activating representative control key 14. According to the illustrated configuration, the selection is annunciated by illumination of corresponding indicator 26. Topographical mode displays, for example, a full color 1:500,000 sectional chart of a desired geographical location. In addition to showing the raster scanned paper sectional chart, the graphics in Topographical mode 14 includes superimposed obstacles, weather data and full Navigation data. Preferably, Topographical mode 14 includes settings for obstacle proximity warning alarms to alert the pilot of impending danger. Preferably, multifunctional display 10 also includes a capability to zoom in on a particular detail or to zoom out to a larger scale color vector type map with aviation data superimposed as in other commercially available topographical displays, such as SkymapIIIC available from Skyforce Avionics Limited. Preferably, vector style maps are also displayed by default in Topographical mode 14 in geographical areas for which raster scanned paper charts are unavailable. Functions of control keys 42 through 50 aligned to the side of display screen 22 are defined in Topographical mode 14 by associated on-screen soft labels 82 through 90, respectively. Upon selection of Topographical mode 14, software or hardware commands control keys 42 through 50 are set via software command or hardware switch to operate the functions associated with selected Topographical mode 14. The relevant functions of control keys 42 through 50 are defined relative to selected Topographical mode 14 via a soft key approach. That is, the associated keypad annotation appear in the form of "key style" graphics on main display screen 22. Respective SUL labels 52 through 60 associated with de-selected primary Navigational mode are deactivated or darkened, and become invisible to the human eye, thereby eliminating operator confusion.

Figure 6B:
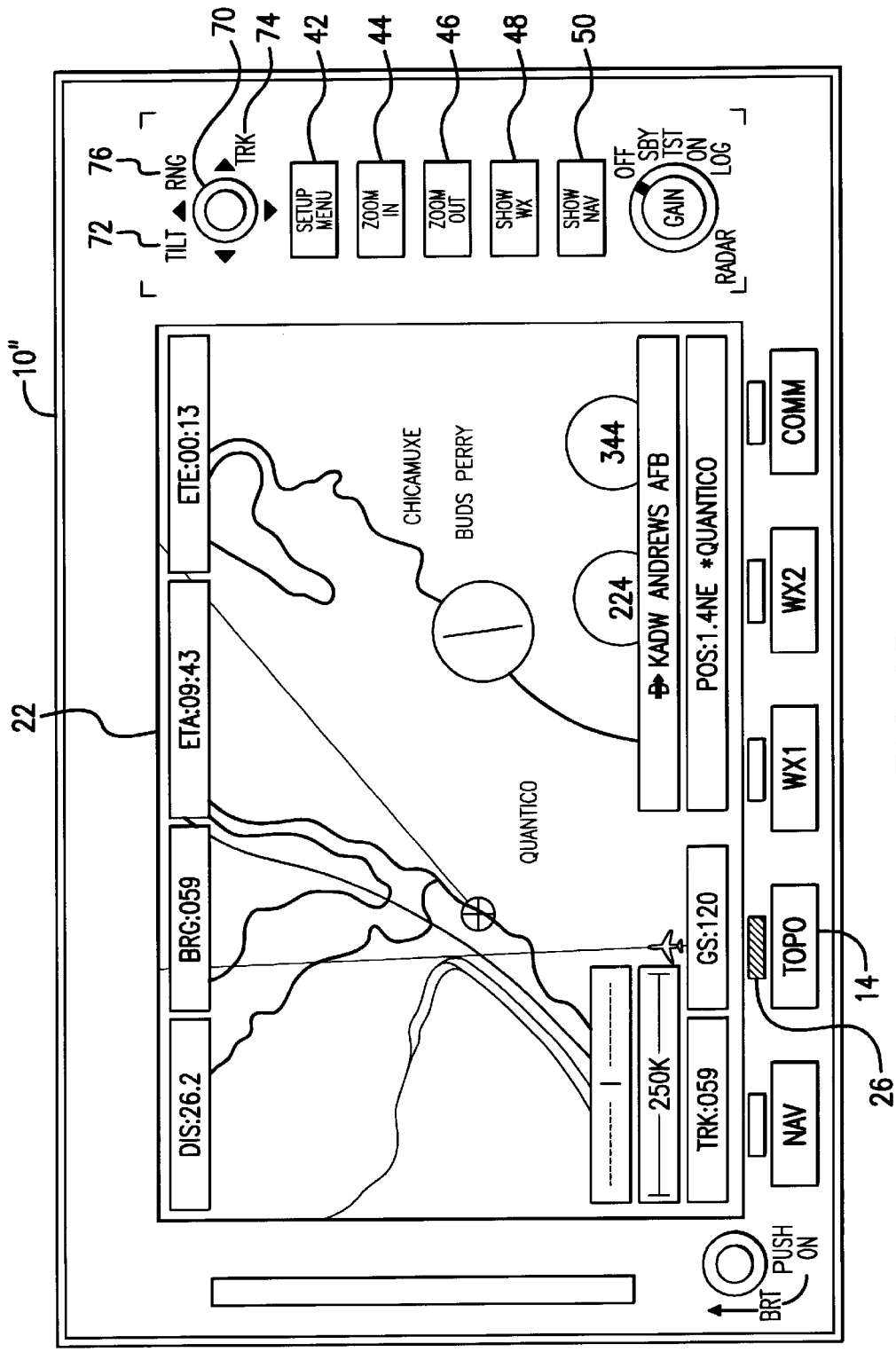
FIG. 6B illustrates an embodiment of avionics multifunctional display of the invention in which a Topographical mode is selected as a "primary" mode of operation, wherein the relevant functions of control keys are defined using an alternative SUL label approach.

FIG. 6B illustrates an alternative embodiment of avionics multifunctional display 10' in which the relevant functions of control keys 42 through 50 are defined relative to selected "primary" Topographical mode 14 using a "SUL legend" approach, as described above and shown in FIG. 4B. That is, the associated keypad legends appear in SUL format on the faces of corresponding ones of control keys 42 through 50. Upon selection of Topographical mode 14, software or hardware commands cause light sources within or below control keys 42 through 50 to illuminate SUL labels on the control keys, as described above in FIG. 4A. Respective SUL labels 52 through 60 associated with de-selected primary Navigational mode are again deactivated or darkened, and become invisible to the human eye, thereby eliminating operator confusion. Thus, multifunctional display 10' is capable of two or more "SUL legend" operational modes in which independent and exclusive SUL legend sets define the functions of the control keys.

According to yet another embodiment of the invention (not shown), multiple independent and exclusive sets of SUL labels are arranged adjacent to control keys 42 through 50. For example, a first set of SUL labels defining control key functions relative to a first "SUL legend" operational mode are positioned to the right of control keys 42 through 50, a second set of SUL labels defining control key functions relative to a second "SUL legend" operational mode are positioned to the left of control keys 42 through 50, and a third set of SUL labels defining control key functions relative to a third "SUL legend" operational mode are positioned on the faces of control keys 42 through 50. These additional configurations allow the invention to be practiced with four or even more sets of SUL labels defining control key functions relative to a multitude of "primary" operational modes. Such alternative embodiments are contemplated by the claimed invention.

Figure 7:
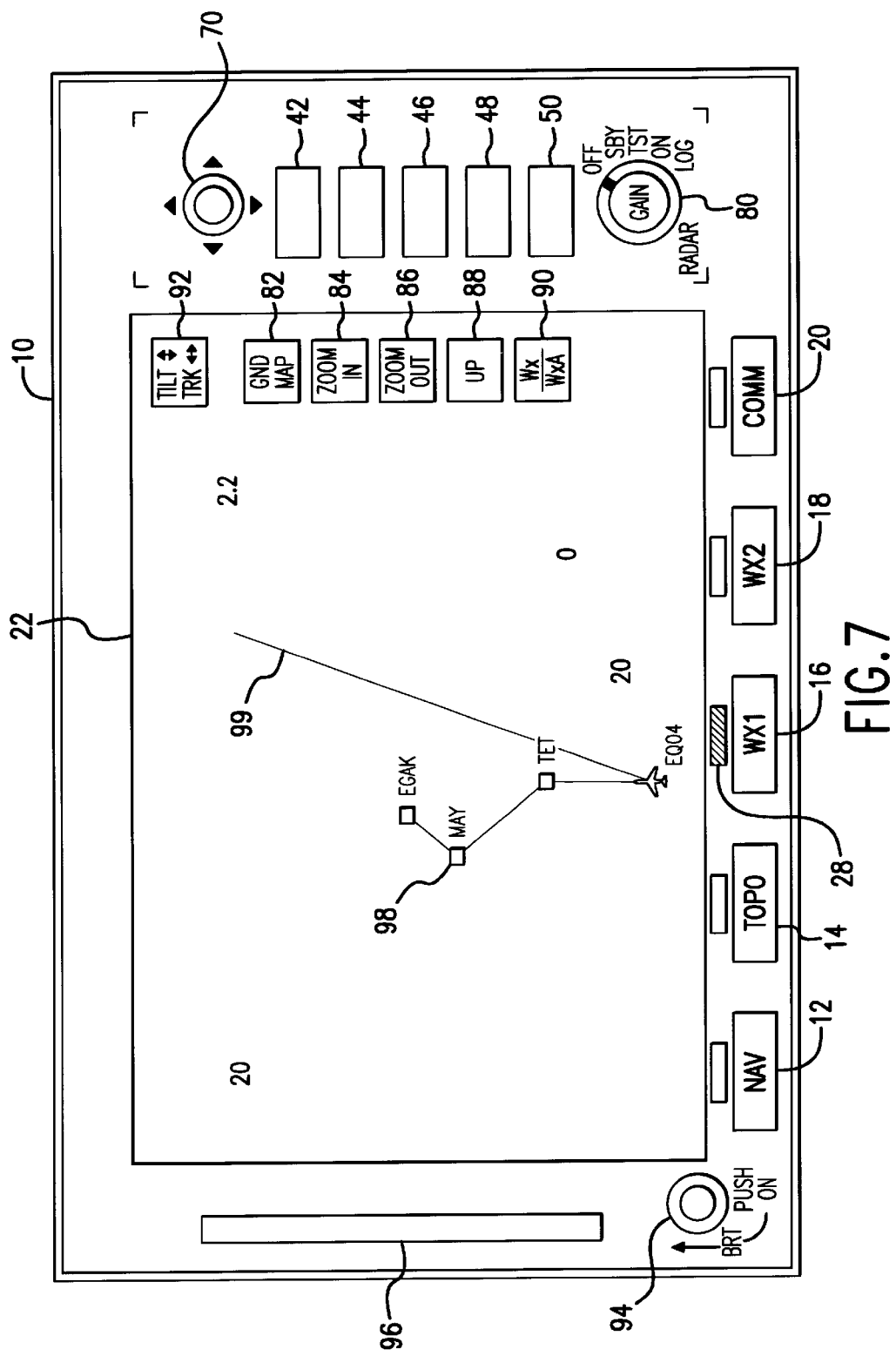
FIG. 7 illustrates an embodiment of the invention displaying a Weather Radar operational mode in an avionics multifunctional display in a "soft label" operational mode format in which SUL legends are extinguished and a set of soft key labels displayed down the side of the screen adjacent to corresponding control keys define the functions of the various control keys relative to the currently selected Weather Radar operational mode.

FIG. 7 illustrates a weather radar or "WX1" operational mode 18 of a preferred embodiment of the invention in an avionics multifunctional display. When selected, as indicated in FIG. 7 by indicator 28, a Weather Radar mode is displayed on display screen 22. Weather Radar mode is a "secondary" operational mode. Therefore, SUL legends 52 through 60 on the front panel adjacent vertical control keys 42 through 50 are invisible, i.e., the illumination sources are deactivated or turned "off." A set of soft key labels 82 through 90 are displayed down the side of the screen adjacent to corresponding control keys 42 through 50. Soft key labels 82 through 90 define the functions of control keys 42 through 50 relative to the currently selected Weather Radar operational mode. Additionally, soft key label 92 defines the "TILT" and "TRK" functions on joystick 70. Furthermore, if a defined route or "GOTO" is being flown, a preferred embodiment of multifunctional display 10 includes the capacity to superimpose enrobe waypoints 98 and track lines 99 onto display screen 22.

Figure 8:
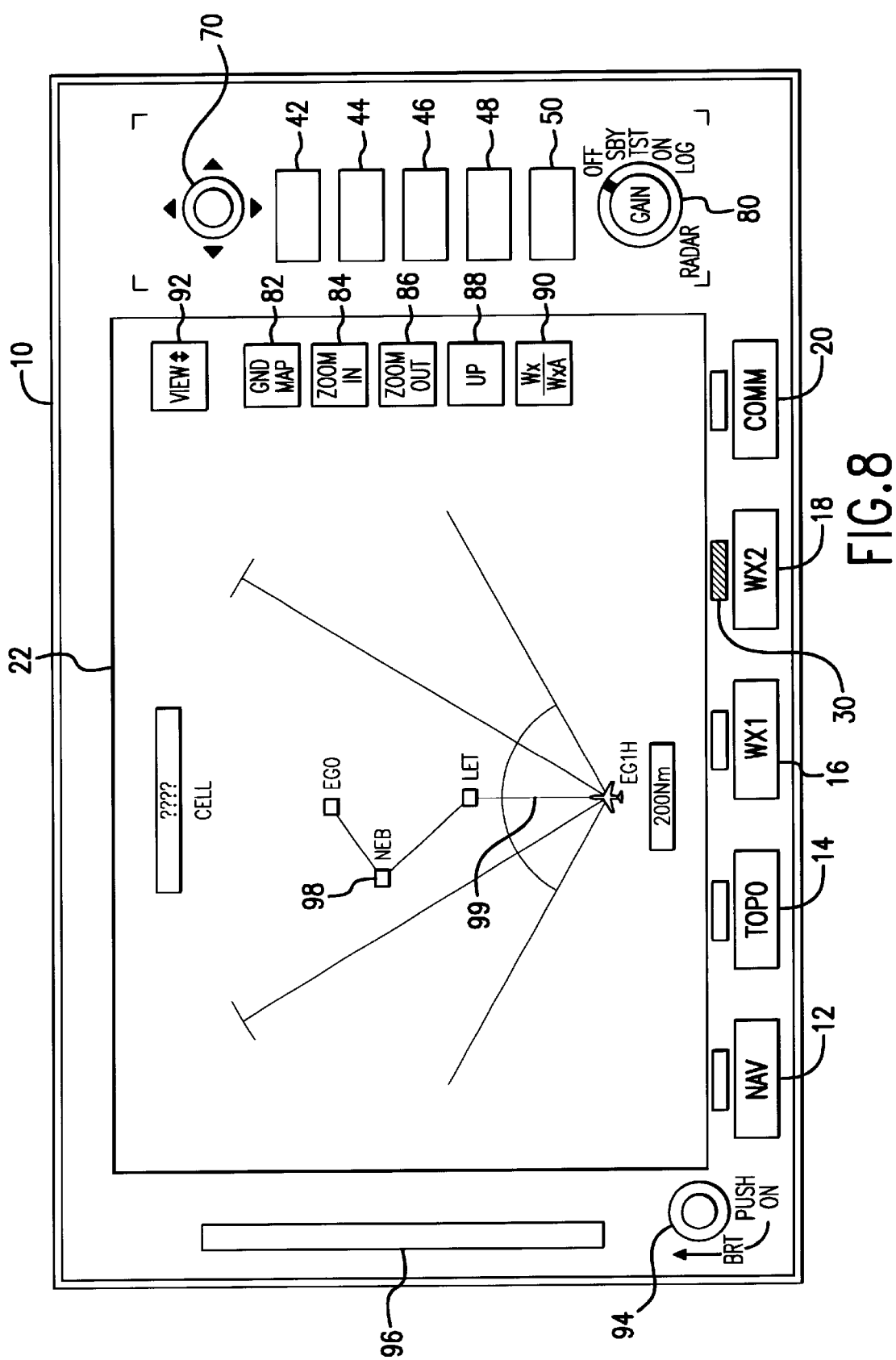
FIG. 8 illustrates an embodiment of the invention displaying a conventional StormScope operational mode in an avionics multifunctional display in a "soft label" operational mode format in which SUL legends are extinguished and a set of soft key labels displayed down the side of the screen adjacent to corresponding control keys define the functions of the various control keys relative to the currently selected Weather Radar operational mode.

FIG. 8 illustrates a conventional StormScope or "WX2" operational mode 18, which processes the input from a weather station, as described above, and provides displays and warnings based on such input. When selected, a StormScope screen is displayed on display screen 22. If a preselected route or "GOTO" is being flown, en route waypoints 98 and track lines 99 are again superimposed on the StormScope display screen. Again, selection of such secondary operational mode causes a software command or a hardware switch to display soft key labels that allow full set-up and use of StormScope operational mode 18. A preferred embodiment of an avionics multifunctional display also includes conventional settings for various alarms to alert the pilot of impending danger. Joystick 70 is used to toggle between 120 degree forward view (shown) or a 360 degree all round view, according to soft label 92 corresponding thereto. Preferably, Navigation mode 12 information is always overlaid either of Weather Radar mode 16 and StormScope mode 18, if a route or "GOTO" is active.

Communications or Radio operational mode 20 is selected by activating control key 20 "COMM," and provides remote tuning of the aircraft's Navigation/ Communication equipment, as mentioned above. Communications operational mode 20 (not illustrated) includes a simple text screen displayed on display screen 22. The text screen shows local navigation/communication facilities and allows the pilot to choose various frequencies and transfer them to a specified on-board navigation/communication unit.

While the preferred embodiment of the invention has been illustrated and described, it will be appreciated that various changes can be made therein without departing from the spirit and scope of the invention.

What is claimed is:

1. A user interface for use in a multifunctional display, the user interface comprising:

a multifunctional display having a display screen and a panel surface;

one or more hard operational mode selection keys situated on said panel surface of said multifunctional display, each of said hard operational mode selection keys being coupled to select different ones of a plurality of operational modes accessible by the user;

a plurality of hard function control keys situated on said panel surface of said multifunctional display adjacent to said display screen, each of said plurality of hard function control keys being in electrical communication with a selected one of said operational modes;

a hard Secret Until Lit label associated with one of said hard function control keys, said Secret Until Lit label being in electrical communication with said hard function control key and presenting a first context sensitive function legend relative to a first selected one of said operational modes; and a soft Secret Until Lit label situated on said display screen adjacent to said hard function control key, said soft Secret Until Lit label being in electrical communication with said hard function control key and presenting a second different context sensitive function legend relative to a second selected one of said operational modes.

2. The user interface recited in claim 1, wherein said secret until lit label is active only when said first one of said operational modes is selected; and wherein said soft label is active only when said second one of said operational modes is selected.

3. The user interface recited in claim 2, wherein said secret until lit label is positioned on a face of said function control key.

4. The user interface recited in claim 2, wherein said secret until lit label is positioned proximate to said function control key.

5. The user interface recited in claim 2, wherein said first one of said operational modes further comprises a primary operational mode and said second one of said operational modes further comprises a secondary operational mode.

6. The user interface recited in claim 2, further comprising:

a plurality of function control keys in electrical communication with said selected one of said operational modes;

a set Secret Until Lit labels including a Secret Until Lit label in electrical communication with each said function control key and presenting a context sensitive function legend relative to said first operational mode; and a set of soft labels including a soft label in electrical communication with each said function control key and presenting a context sensitive function legend relative to said second operational mode.

7. The user interface recited in claim 6, wherein:

said first operational mode comprises one of a plurality of first operational modes; and wherein said set of Secret Until Lit labels further comprises a plurality of independent sets of Secret Until Lit labels, each set of Secret Until Lit labels including a Secret Until Lit label in electrical communication with each said function control key and presenting a context sensitive function legend relative to said selected one of said first operational modes.

8. The user interface recited in claim 7, wherein said second operational mode comprises one of a plurality of second operational modes; and wherein each said soft label further comprise independent sets of soft labels, each set of soft including a soft label in electrical communication with each said function control key and presenting a context sensitive function legend relative to said selected one of said second operational modes.

9. A multifunctional display comprising:

a plurality of hard operational mode control keys, each of said operational mode control keys coupled to select one of a plurality of different operational modes;

a display screen coupled to display graphics related to a selected one of said operational modes;

one or more hard function control keys, each of said hard function control keys coupled to control functions relative to said selected operational mode;

one or more Secret Until Lit legends activated with a first one of said operational modes, each of said Secret Until Lit legends associated with a respective one of said hard function control keys and defining a function of each of said hard function control keys relative to said first operational mode; and one or more on-screen legends activated with a second different one of said operational modes, each of said on-screen legends associated with a respective one of said hard function control keys and defining a function of each of said hard function control keys relative to said second operational mode.

10. The multifunctional display recited in claim 9, wherein:

each of said Secret Until Lit legends activated with a first one of said operational modes defines a function of said associated one of said function control keys relative to said first operational mode; and each of said on-screen legends activated with a second one of said operational modes defines a function of said associated one of said function control keys relative to said second operational mode.

11. The multifunctional display recited in claim 10, wherein one or more of said Secret Until Lit legends is positioned on a face of the multifunctional display adjacent to said associated one of said function control keys.

12. The multifunctional display recited in claim 10, wherein one or more of said Secret Until Lit legends is positioned on a face of said associated one of said function control keys.

13. The multifunctional display recited in claim 10, wherein:

said first operational mode further comprises one of a plurality of first operational modes; and said Secret Until Lit legends further comprise one of a plurality of sets of Secret Until Lit legends, each one of said plurality of sets of Secret Until Lit legends associated with a respective one of said first operational modes.

14. The multifunctional display recited in claim 10, wherein:

said second functional mode further comprises one of a plurality of second functional modes; and said on-screen legends further comprise one of a plurality of sets of on-screen legends, each one of said plurality of sets of on-screen legends associated with a respective one of said second operational modes.

15. The multifunctional display recited in claim 10, wherein each said secret until lit legend further comprises:

a structure formed of substantially rigid transparent plastics material having a first entry face and an opposing exit face;

an illumination source mounted proximately to said entry face, said illumination source coupled to said first operational mode and generating illumination responsively to selection of said first operational mode; and a label positioned proximately to said exit face.

16. The multifunctional display recited in claim 15, further comprising a light diffuser positioned between said exit face and said label.

17. The multifunctional display recited in claim 16, wherein said label further comprises said light diffuser.

18. The multifunctional display recited in claim 10, wherein each of said first and second operational modes further comprises one of an operational mode selected from a Navigation operational mode, a Topography operational mode, a weather radar operational mode, a weather data processing operational mode, and a Communication operational mode.

19. The multifunctional display recited in claim 18, wherein at least one of said first operational modes further comprises said Navigation operational mode.

20. The multifunctional display recited in claim 19, wherein:

each said first and second operational mode is operated by a separate processor board containing a microprocessor, memory and input/output interface, each said processor board operating operational mode software; and a data bus interconnecting each said separate processor board under the control of a system superintendent.

21. The multifunctional display recited in claim 20, wherein said system superintendent further comprises one of said separate processor boards.

22. A method for independently defining different context sensitive functions of one or more control keys in a multifunctional display relative to a plurality of independent operational modes, the method comprising:

presenting a first context sensitive function legend relative to a first selected one of a plurality of operational modes for defining a first function of a hard control key relative to said first selected operational mode by illuminating a secret until lit label associated with said hard control key; and presenting a second different context sensitive function legend relative to a second selected one of a plurality of operational modes for defining a second different function of said hard control key relative to said second selected operational mode by illuminating a soft label associated with said hard control key.

23. The method recited in claim 22, wherein:

said first context sensitive function legend defines a function of a control key relative to said first selected operational mode; and said second context sensitive function legend defines a function of said control key relative to said second selected operational mode.

24. The method recited in claim 23, wherein:

said control key is one of a plurality of control keys;

said secret until lit label is one of a plurality of secret until lit labels, each said secret until lit label presenting one of a plurality of said context sensitive function legends associated with respective control keys; and said soft label is one of a plurality of soft labels, each said soft label presenting one of a plurality of said context sensitive function legends associated with respective control keys.

25. The method recited in claim 24, wherein said illuminating a secret until lit label further comprises illuminating a secret until lit label positioned on a panel adjacent to a respective control key.

26. The method recited in claim 24, wherein said illuminating a secret until lit label further comprises illuminating a secret until lit label positioned on a surface of a respective control key.

27. A method for labeling one or more control keys, knobs or switches positioned on a hard control panel adjacent to a display screen using a combination of both hard panel and soft on-screen "Secret Until Lit" labeling with each single control, the method comprising:

operating in combination a first secret until lit label on a hard control panel and a second secret until lit soft label on a display screen, said first and second secret until lit labels defining different first and second functions of an associated hard control key relative to different first and second operational modes by:

exclusively illuminating on said hard control panel said secret until lit label in electrical contact with a first selected one of said plurality of different operational modes and defining a function of said associated hard control key relative to said first selected operational mode;

exclusively illuminating on a display screen a secret until lit soft label in electrical contact with a second selected one of said plurality of different operational modes and defining a function of said control key relative to said first selected operational mode;

and extinguishing on said hard control panel said illuminated secret until lit label.

28. The method recited in claim 27, wherein:

said illuminating a secret until lit label further comprises illuminating a plurality of secret until lit labels, each said secret until lit label in electrical contact with a function of said first selected operational mode and defining a function of a control key relative to said first selected operational mode; and said illuminating a soft label further comprises illuminating a plurality of soft labels, each said soft label in electrical contact with a function of said second selected operational mode and defining a function of a control key relative to said second selected operational mode.

29. The method recited in claim 28, wherein said first selected operational mode further comprises one of a Navigation operational mode, a Topography operational mode, a weather radar operational mode, a weather data processing operational mode, and a Communication operational mode.

30. The method recited in claim 29, wherein said second selected operational mode further comprises one of a Navigation operational mode, a Topography operational mode, a weather radar operational mode, a weather data processing operational mode, and a Communication operational mode, which is different from said first selected operational mode.

* * * * *